(12) United States Patent
Gentry et al.

(10) Patent No.: US 12,647,513 B1
(45) Date of Patent: Jun. 2, 2026

(54) METHODS, SYSTEMS AND COMPUTER PROGRAM PRODUCTS FOR PROVIDING BRAND IDENTIFICATION WITH INCOMING COMMUNICATIONS

(71) Applicant: Bandwidth Inc., Raleigh, NC (US)

(72) Inventors: William Gentry, Raleigh, NC (US); Ankush Gangwani, Aldie, VA (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 19/411,888

(22) Filed: Dec. 8, 2025

(51) Int. Cl.
        *H04M 3/42* (2006.01)
        *H04M 1/663* (2006.01)
(52) U.S. Cl.
        CPC ....... *H04M 3/42042* (2013.01); *H04M 1/663* (2013.01)
(58) Field of Classification Search
        None
        See application file for complete search history.

(56) References Cited

U.S. PATENT DOCUMENTS

| | | | | |
|---|---|---|---|---|
| 9,078,134 | B2 * | 7/2015 | Cudak | H04W 12/08 |
| 2020/0259955 | A1 * | 8/2020 | Knuth | H04M 3/4365 |
| 2020/0396331 | A1 * | 12/2020 | Gupta | H04M 3/42042 |
| 2021/0075907 | A1 * | 3/2021 | Murphy | H04M 15/06 |
| 2022/0263942 | A1 * | 8/2022 | Hamilton | H04M 3/42042 |
| 2022/0329690 | A1 * | 10/2022 | Murphy | H04M 3/53366 |
| 2024/0275825 | A1 * | 8/2024 | Filart | H04L 65/1069 |
| 2024/0396992 | A1 * | 11/2024 | Fowler | H04M 3/4365 |

* cited by examiner

*Primary Examiner* — Quoc D Tran
(74) *Attorney, Agent, or Firm* — Gregory Stephens

(57) ABSTRACT

Methods for providing brand identification with incoming communications at a mobile device are provided. The methods include receiving a request for a communication session with a mobile device from an originating enterprise, the mobile device having a mobile app associated with the originating enterprise installed on the mobile device; obtaining information associated with the originating enterprise including a telephone number and brand information associated with the originating enterprise; and pushing the information associated with the originating enterprise to the mobile device utilizing the mobile app associated with the originating enterprise installed on the mobile device such that the information associated with the originating enterprise is delivered to the mobile device simultaneously with delivery of the communication session.

24 Claims, 7 Drawing Sheets

267

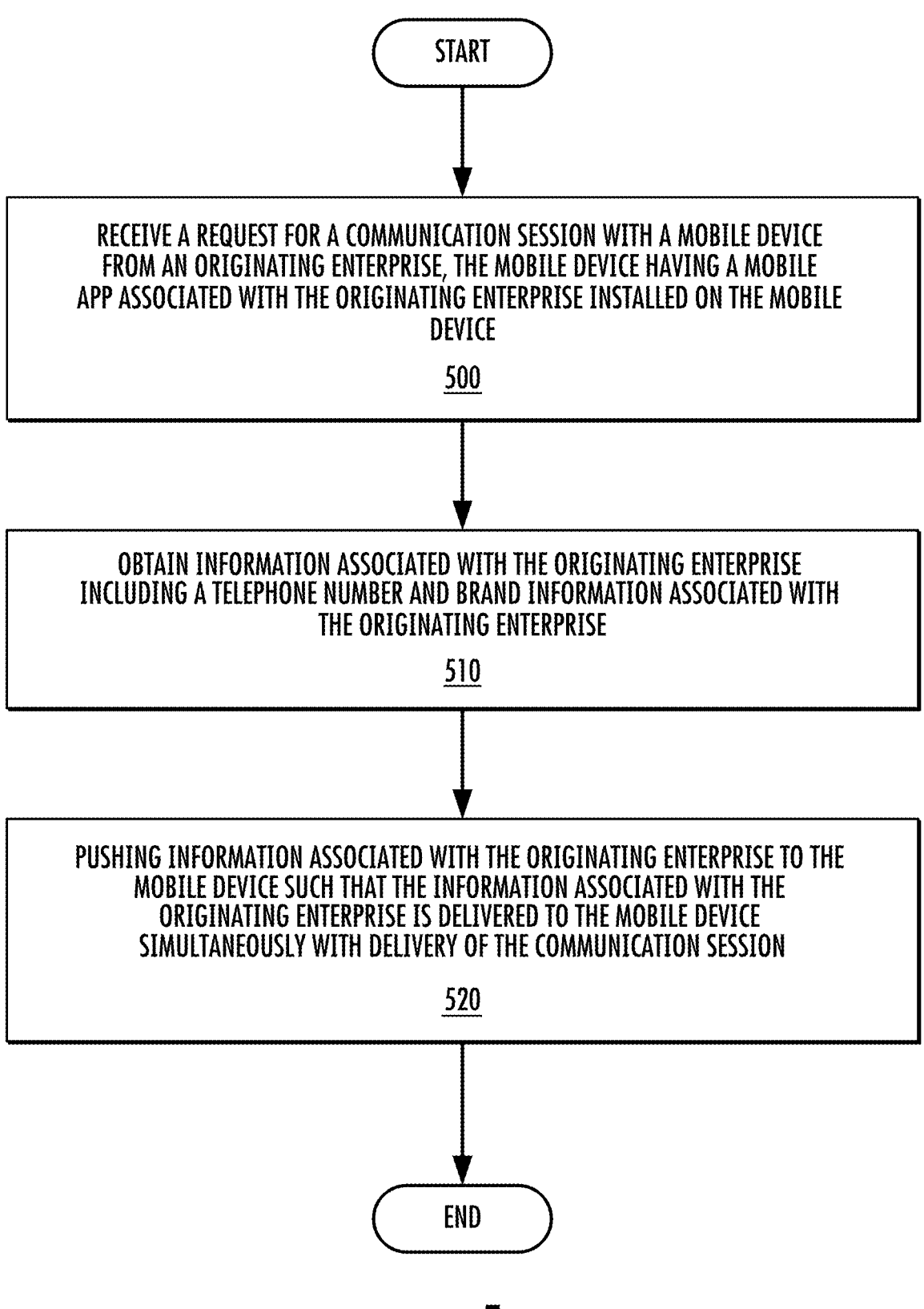

START

RECEIVE A REQUEST FOR A COMMUNICATION SESSION WITH A MOBILE DEVICE FROM AN ORIGINATING ENTERPRISE, THE MOBILE DEVICE HAVING A MOBILE APP ASSOCIATED WITH THE ORIGINATING ENTERPRISE INSTALLED ON THE MOBILE DEVICE

500

OBTAIN INFORMATION ASSOCIATED WITH THE ORIGINATING ENTERPRISE INCLUDING A TELEPHONE NUMBER AND BRAND INFORMATION ASSOCIATED WITH THE ORIGINATING ENTERPRISE

510

PUSHING INFORMATION ASSOCIATED WITH THE ORIGINATING ENTERPRISE TO THE MOBILE DEVICE SUCH THAT THE INFORMATION ASSOCIATED WITH THE ORIGINATING ENTERPRISE IS DELIVERED TO THE MOBILE DEVICE SIMULTANEOUSLY WITH DELIVERY OF THE COMMUNICATION SESSION

520

END

FIG. 5

METHODS, SYSTEMS AND COMPUTER PROGRAM PRODUCTS FOR PROVIDING BRAND IDENTIFICATION WITH INCOMING COMMUNICATIONS

FIELD

The present inventive concept generally relates to telecommunications networks and, more particularly, to providing brand information associated with the enterprise initiating the communication at the same time as the communication is delivered to the user.

BACKGROUND

Call branding is a service that displays a business' verified name and/or, logo, and the reason for the communication (call) on a customer's phone when receiving a call. Call branding aims to increase call answer rates by building trust and reducing the likelihood that a call will be mistaken for spam or be blocked. Improved methods of call branding are desired.

SUMMARY

Some embodiments of the present inventive concept provide methods for providing brand identification with incoming communications at a mobile device. The methods include receiving a request for a communication session with a mobile device from an originating enterprise, the mobile device having a mobile app associated with the originating enterprise installed on the mobile device; obtaining information associated with the originating enterprise including a telephone number and brand information associated with the originating enterprise; and pushing the information associated with the originating enterprise to the mobile device utilizing the mobile app associated with the originating enterprise installed on the mobile device such that the information associated with the originating enterprise is delivered to the mobile device simultaneously with delivery of the communication session.

Related systems and computers are also provided.

BRIEF DESCRIPTION OF THE DRAWINGS

FIG. 5 is a flowchart illustrating operations for processing incoming calls in accordance with some embodiments of the present inventive concept.

DETAILED DESCRIPTION OF EMBODIMENTS

Figure 1:
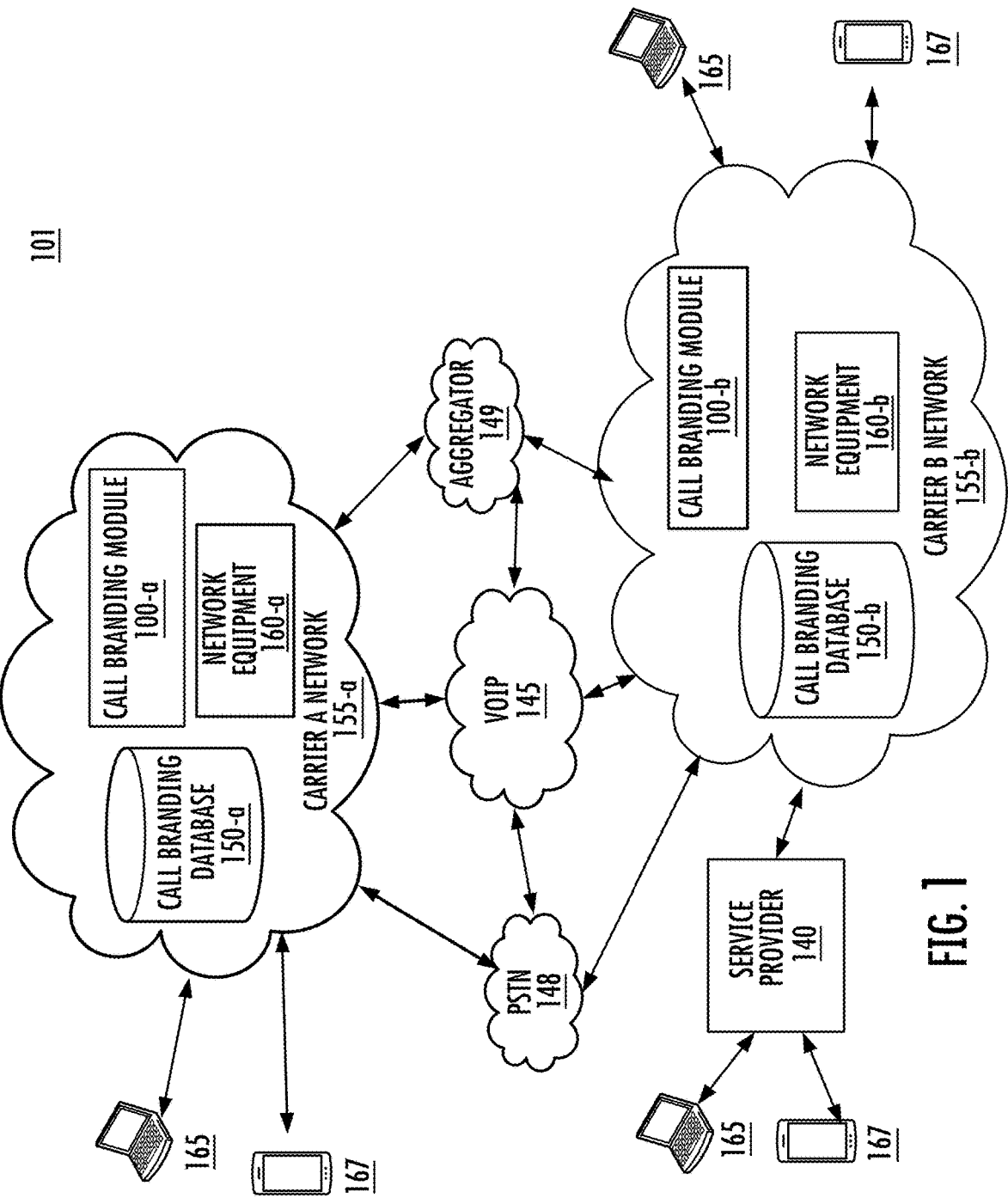
FIG. 1 is a block diagram illustrating a network for use in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, call branding is a service that displays a business' verified name and/or logo, and the reason for the communication (voice call) on a customer's phone when receiving a call. Call branding aims to increase call answer rates by building trust and reducing the likelihood that call will be mistaken for spam or be blocked. However, currently call branding is delivered using, for example, a complex ecosystem of capabilities emanating from mobile network operators (MNOs) and their analytic engines, which can be very expensive.

Some embodiments of the present inventive concept utilize the knowledge that a large segment of enterprises make most of their outbound calls to existing customers. Many of these customers have a mobile application ("mobile app") associated with the enterprise running on their device. Accordingly, some embodiments of the present inventive concept may utilize the mobile app that is already resident on the customer's device to deliver an authenticated brand associated with the enterprise to the customer's mobile device, in combination and simultaneously with the inbound call. As used herein, "simultaneously" refers to two things happening at about the same time, but not necessarily at the exact same time. Details of embodiments will be further discussed herein with respect to the figures.

A mobile application, or app, is a software program specifically designed to run on mobile devices such as smartphones and tablets. They provide access to a wide range of functions, such as gaming, social networking, banking, and accessing information like news and weather updates. Mobile apps can be installed directly onto a device from, for example, app stores, contrasting with web apps that run in a mobile browser. As used herein, enterprise refers to any organization that produces goods or services. An enterprise may be, for example, a bank, doctors office, hospital and the like.

It will be understood that although embodiments of the present inventive concept are discussed herein with respect to a mobile app associated with a specific enterprise resident on the user's mobile device, embodiments of the present inventive concept are not limited thereto. The call branding may be performed in combination with a third party mobile app without departing from the scope of the present inventive concept. For example, in some embodiments the branding information for the enterprise may be provided through a third-party application, such as Zoom®.

Referring now to FIG. 1, a block diagram illustrating an example system 101 according to some embodiments of the present inventive concept will be discussed. As illustrated, the system 101 includes a voice over internet protocol (VOIP) network 145; a public switched telephone network (PSTN) 148; an aggregator 149; a plurality of Carrier networks, for example, Carrier A Network 155-*a* and Carrier B Network 155-*b*; a service provider 140 and a plurality of endpoints 165 and 167 in communication with the Carrier Networks 155-*a* and 155-*b* and the service provider 140. Although only two Carriers are illustrated in FIG. 1, it will be understood that one Carrier or more than two Carriers may be present in the system without departing from the scope of the present inventive concept. The system 101 of FIG. 1 is provided for example only and embodiments are not limited thereto.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks. The aggregator 149 is an intermediary that provides a single point of contact for managing and reselling services from, for example, multiple providers. These services can include, for example, voice, data, and wireless, offering benefits like cost savings through bulk purchasing, simplified billing, and a unified management platform. It will be understood that the aggregator 149 may be combined with other elements of the system 101, for example, the carrier 155-*a*/155-*b* or the service provider 140, without departing from the scope of the present inventive concept.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VOIP phone, IoT device, or another telephonic device. The endpoints 165 and 167 communicate through the networks 145 and 148 and the Carriers 155-*a* and 155-*b*. In some embodiments, the "mobile app" associated with the enterprise for use in call branding discussed herein may be loaded onto the mobile device 167 as will be discussed further herein.

As used herein, the term a "telecommunications Carrier" may refer to any provider of telecommunications services. FIG. 1 also includes a service provider 140. It will be understood that a Carrier, such as Carrier A and B in FIG. 1 may be a service provider, for example, Bandwidth, Verizon, AT&T and the like. However, the reverse is not true, a service provider 140 is not necessarily a Carrier. In embodiments where the service provider 140 is not a Carrier, the service provider 140 may be a customer of the Carrier. FIG. 1 illustrates, the service provider 140 being a customer of Carrier B 155-*b*. It will be understood that although the service provider 140 is shown as only being a customer of Carrier B 155-*b*, embodiments of the present inventive concept are not limited thereto. The service provider 140 may be customer of other Carriers or there may be additional service providers in the system 101 without departing from the scope of the present inventive concept. Furthermore, both the carrier and service provider may also be an aggregator.

As further illustrated in FIG. 1, each Carrier Network 155-*a* and 155-*b* may include call branding databases 150-*a* and 150-*b*; network equipment 160-*a* and 160-*b* and call branding modules 100-*a* and 100-*b*, respectively, in accordance with embodiments discussed herein. Although not shown FIG. 1, these modules may also be present in other elements of the system 101. For example, these elements may be present at the service provider 140, the aggregator 149, a network cloud, a direct Carrier aggregator (DCA), a content service provider (CSP) and the like without departing from the scope of the present inventive concept. The network equipment 160-*a* and 160-*b* may illustrate any hardware used to send, receive, and route calls at the Carrier Network 155-*a* and 155-*b*.

The call branding database 150-*a* and 150-*b* may include a list of all enterprises that subscribe to the call branding service in accordance with embodiments discussed herein. Each enterprise subscriber has an associated telephone number, name and/or logo that may be presented to the call recipient simultaneously with receipt of incoming calls. For example, the enterprise could include banks, doctor(s), mechanics, dog groomer, hairdressers, hospitals, insurance companies and the like. As discussed further below with respect to FIGS. 2 and 3, the call branding module 100-*a* and 100-*b* may interact with a mobile app associated with the enterprise that is installed on a user's mobile device. However, embodiments of the present inventive concept are not limited to this configuration.

The call branding module 100-*a* and 100-*b* may provide methods, systems and computer program products for call branding in accordance with embodiments discussed herein. For example, when an outgoing call is received from an enterprise that subscribes to the call branding service, a brand and/or logo associated with the enterprise may be displayed on the user's phone in accordance with embodiments discussed herein. In some embodiments, the call branding module 100-*a* and 100-*b* interacts with a mobile app installed on the user's device associated with the enterprise that the call is associated with. Details with respect to these embodiments will be discussed further below. The carrier/service provider/aggregator may offer aspects of embodiments discussed herein as a service to enterprise customers that may want call branding included on their incoming calls.

Figure 2:
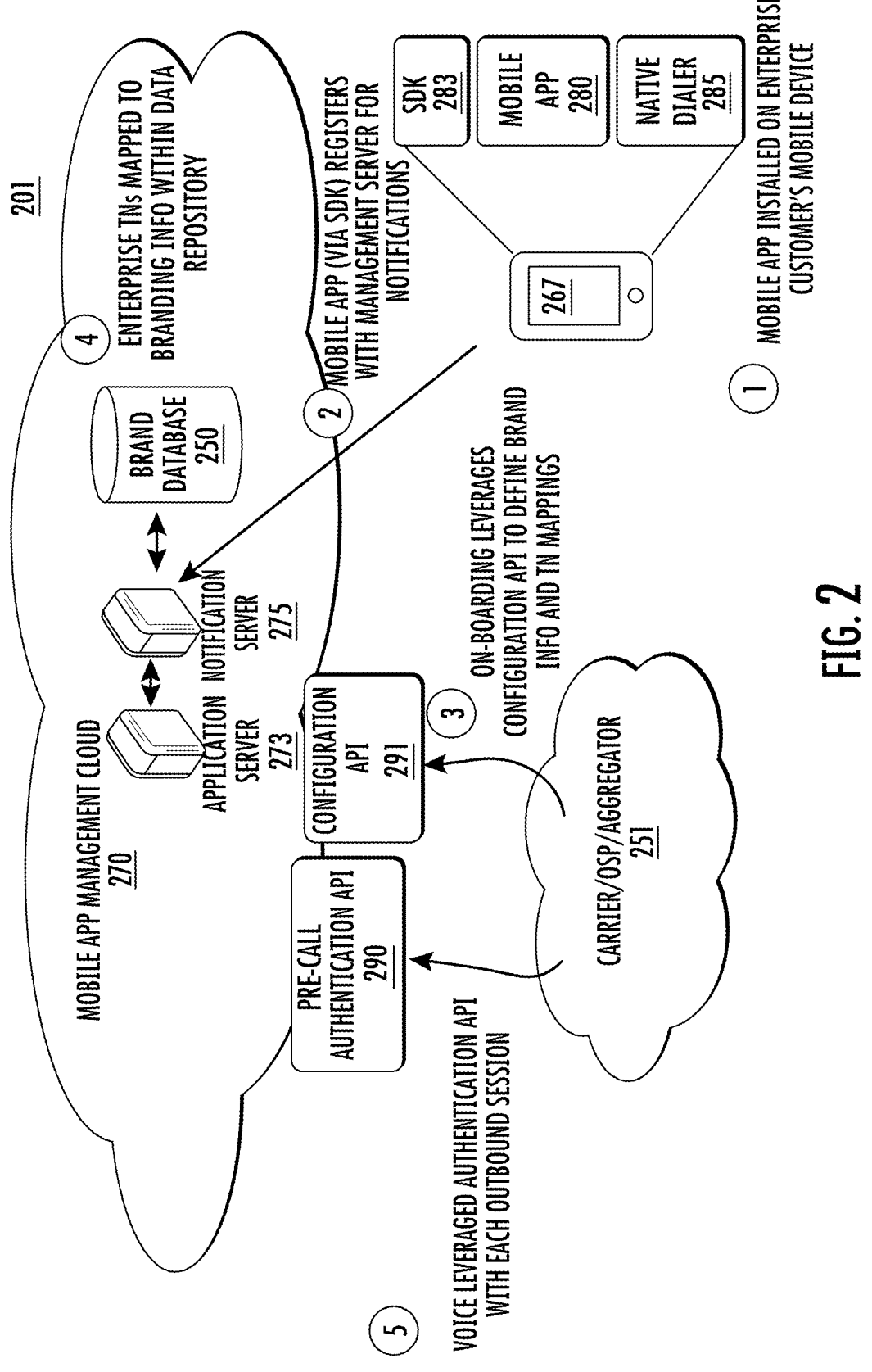
FIG. 2 is a diagram illustrating details associated with a call branding module in accordance with some embodiments of the present inventive concept.

Referring now to FIG. 2, a flow diagram illustrating operations of call branding services in accordance with some embodiments of the present inventive concept will be discussed. Thus, FIG. 2 illustrates setting up the call branding service in accordance with some embodiments of the present inventive concept. The system 201 does not include all the details illustrated in the system 101 of FIG. 1, however, it will be understood that all necessary elements are included but may not be illustrated in FIG. 2.

As illustrated, the system 201 includes a mobile app management cloud 270, an entity such as a carrier, originating service provider (OSP) or an aggregator 251 and a mobile device 267. As further illustrated, the mobile app management cloud 270 includes a brand database 250 and multiple application programming interfaces (APIs) 290 and 291 that enable communication with the entity 251 and/or the mobile device 267. It will be understood that the elements of the system illustrated in FIG. 2 may be located in various elements of the system without departing from the scope of the present inventive concept and FIG. 2 is only provided as an example.

As further illustrated, the mobile device 267 includes at least one mobile app 280 associated with an enterprise, for example, a bank. The mobile device 267 further includes a software development kit (SDK) 283 and a native dialer 285. As used herein, an SDK is a collection of tools, libraries, documentation, and/or sample code that allows developers to create applications or integrate functionalities specifically designed for telecommunication platforms and services. For example, an SDK may be a pre-packaged bundle of resources that enables developers to add telecom-related features to their applications without having to build everything from scratch. The "native dialer" refers to a built-in phone or dialer application that comes pre-installed on a smartphone, such as the Phone app on an Android device or the Phone app on an iPhone. In other words, the native dialer is the part of the device that is dedicated to telephone functions. The mobile app 280 and the native dialer 285 are generally running independently on the mobile device. The SDK 283 and the mobile app 280 are configured to present the call branding information as discussed further herein.

The call branding service in accordance with embodiments of the present inventive must be set up in the system 201. Referring to FIG. 2, a mobile app 280 associated with the enterprise customer is installed on the mobile device 267 of the user (1). For example, the enterprise may be a bank and the mobile app associated with bank may be installed on the mobile device 267. It will be understood that the mobile device 267 may be an android device, an iPhone or any other qualifying device without departing from the scope of the present inventive concept.

Utilizing, for example, the SDK 283, of the mobile device 267 the mobile app 280 registers with the mobile app management cloud 270 in communication with a notification server 275 (2). As discussed above, the management cloud 270 can be positioned in various elements of the system 201 without departing from the scope of the present inventive concept.

In embodiments illustrated in FIG. 2, the entity 251 manages the registration of the mobile app 280 using, for example, the configuration API 291 to define the brand information in the brand database 250 and define map telephone number (TN) mappings (3). These enterprise TNs are then officially mapped to the branding information within the brand database 250 (4). Thus, when outbound traffic associated with an enterprise that subscribes to the call branding service is sent from the entity 351, the pre-call authentication API 290 locates the relevant call branding information and prepares to push it to the user on the mobile device 267 when the mobile device 267 receives an incoming call (5).

It will be understood that the system 201 of FIG. 2 is provided as an example only and embodiments are not limited thereto. For example, although the pre-call authentication API 290 and the configuration API 291 are shown as two separate elements, these elements can be combined without departing from the scope of the present inventive concept. Similarly, the various servers 273 and 275 may be provided by a single server. The APIs are shown as sitting on the edge of the mobile app management cloud 270 but could also be at the entity 251 without departing from the scope of the present inventive concept.

An outbound call flow in accordance with some embodiments of the present inventive concept will now be discussed with respect to the system 301 illustrated in FIG. 3A. It will be understood that the system of FIG. 3A is provided as an example only and embodiments are not limited thereto.

Figure 3A:
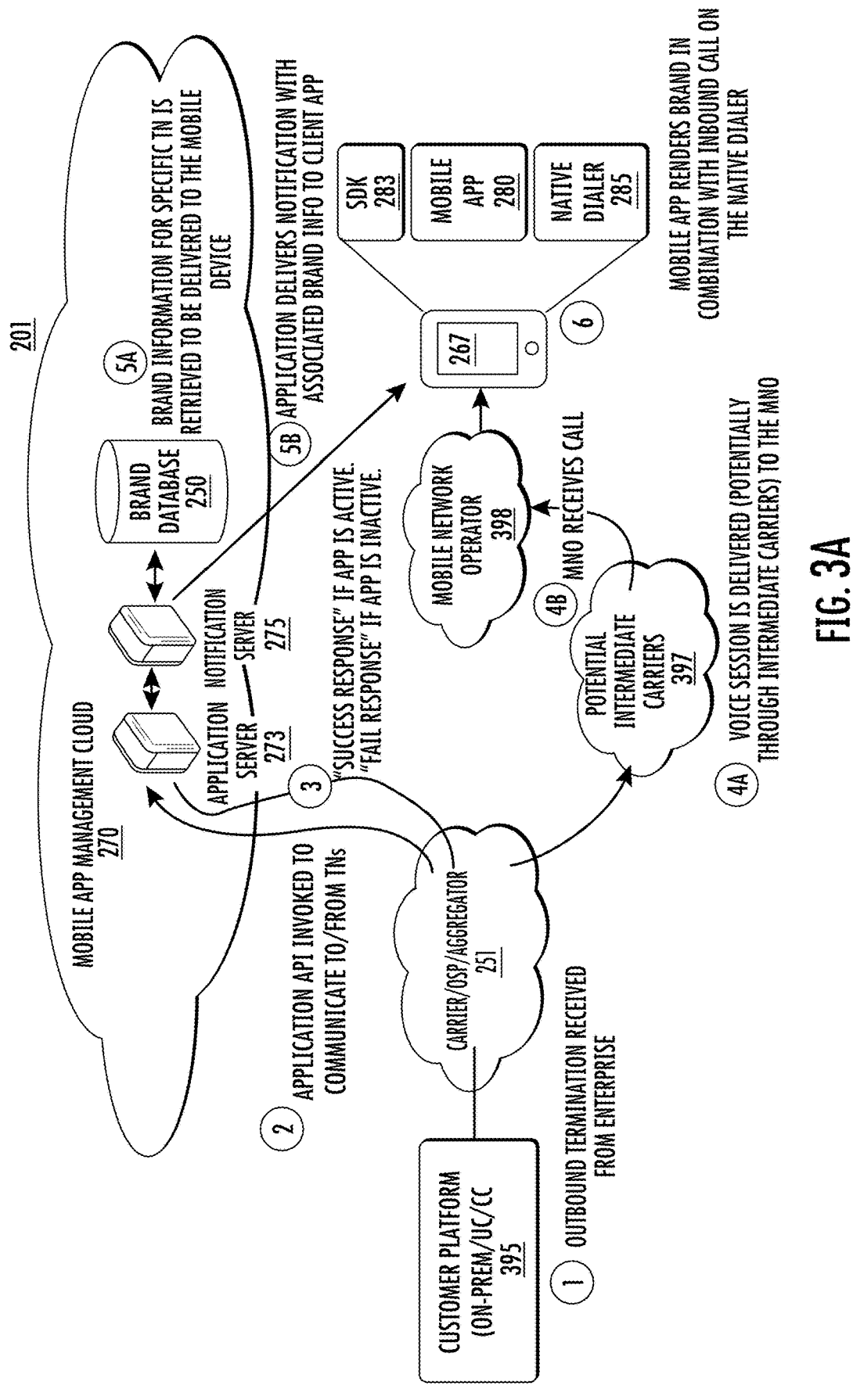
FIGS. 3A and 3B are diagrams illustrating operations of providing call branding information with an incoming call at the mobile device in accordance with some embodiments of the present inventive concept.

Referring to FIG. 3A, the outbound communication is sent from the enterprise (customer platform) 395 to the entity 251 (1). It will be understood that this enterprise 395 subscribes to the call branding service in accordance with embodiments discussed herein. The entity 251 invokes the Application API (2) to communicate to and from TNs and the application API returns a "success" or "fail" response (3). If the app is active, a success response is returned. If the app is inactive, a fail response is returned. Thus, this step verifies if the call is legitimate. If a success response is received, the entity 251 sends the voice session to the MNO 398 (4B) possibly through one or more intermediate carriers 397 (4A).

At the same time as steps 4A and 4B, brand information for the specific TN associated with the entity 395 initiating the voice session is retrieved from the brand database 250 to be delivered to the mobile device 267 (5A) and the call branding information is delivered to the mobile device 267 with the voice session (5B). Thus, it will be understood that steps 4A/4B and 5A/5B are being performed essentially in parallel.

Figure 4:
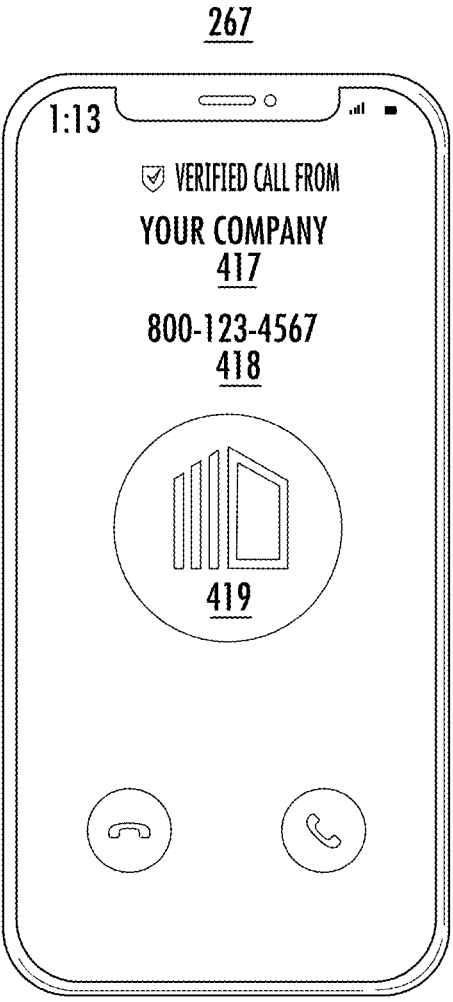
FIG. 4 is a diagram illustrating call branding depicted on a mobile device in accordance with some embodiments of the present inventive concept.

An example of a mobile device 267 including the call branding information in accordance with embodiments discussed herein is illustrated in FIG. 4. As illustrated therein, the name of the enterprise (Your Company) 417, the TN associated with the enterprise 418 and the enterprise's logo 419 may be displayed on the mobile device 267 when the voice call is received. FIG. 4 is provided as an example only and, therefore, embodiments are not limited thereto. The configuration of the information as well as the content thereof may be changed without departing from the scope of the present inventive concept.

Thus, some embodiments of the present inventive concept push the call branding information using, for example, the notification server 275, out to the mobile device 267. The call branding information is pushed out simultaneously with the incoming call from the enterprise to the user's device. The fact that the call branding information is pushed to the mobile device at the same time as the call from the enterprise arrives as the mobile device, decreases the likelihood that the call is fraudulent. It would be very difficult for a fake call to coordinate with the app on the user's phone to produce the call branding information and the voice call simultaneously.

Figure 3B:
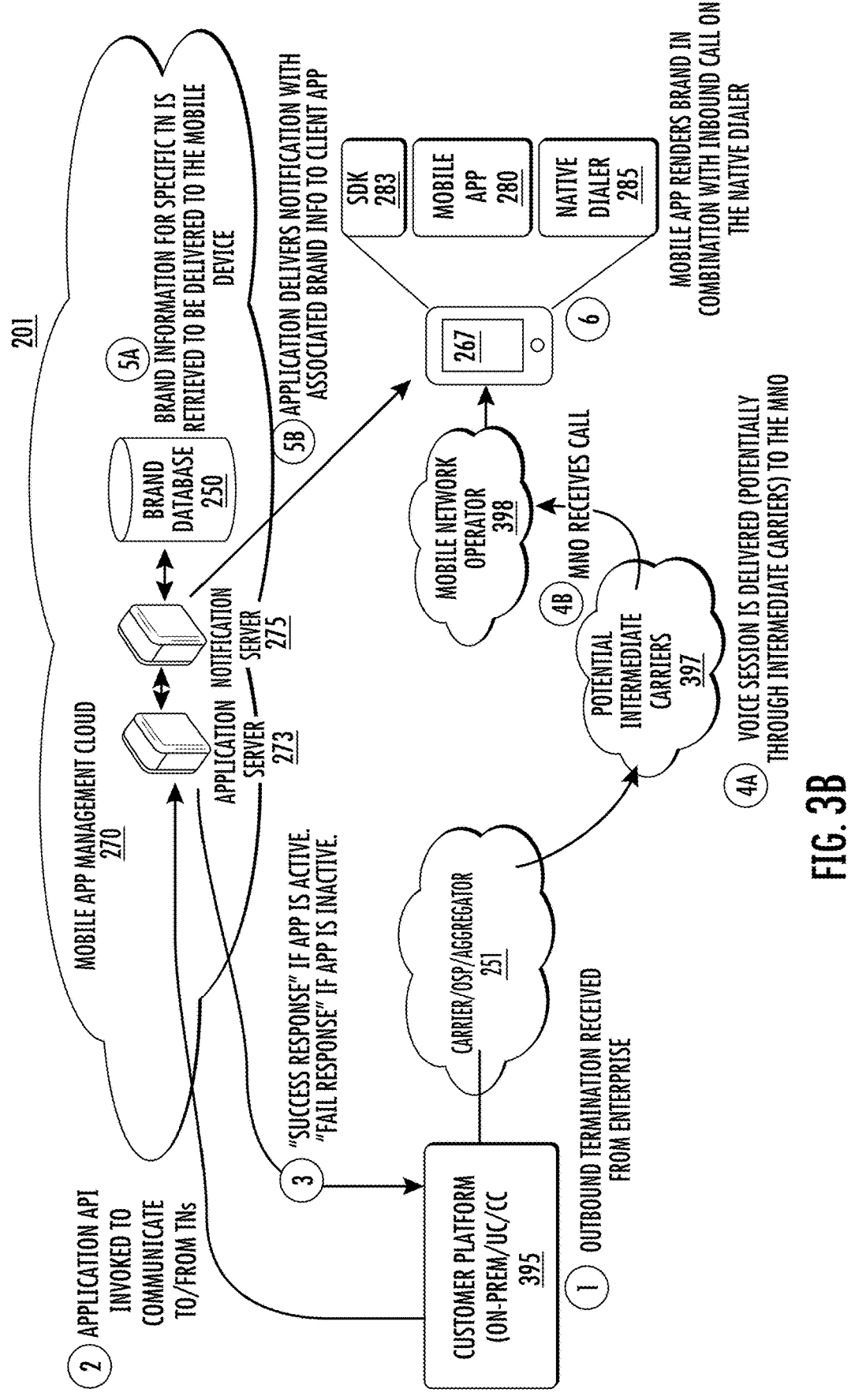

Referring now to FIG. 3B, although embodiments illustrated in FIG. 3A illustrate steps 2 and 3 being initiated by the entity 251, embodiments of the present inventive concept are not limited thereto. For example, as shown in FIG. 3B, in some embodiments these steps may be initiated by the enterprise 395 itself. Steps 2 and 3 are shown as initiating and terminating, respectively, at the enterprise 395. Any entity may invoke the API without departing from the scope of the present inventive concept.

Furthermore, although embodiments of the present inventive concept are discussed above with respect to an enterprise specific mobile app on the mobile device, embodiments of the present inventive concept are not limited thereto. For example, call branding may be used in combination with third party applications as well. For example, Zoom®, Google Meet®, Teams® and the like. In these embodiments, the branding information can be provided to these third party applications and the branding information can be displayed when these connections are made.

Accordingly, some embodiments of the present inventive concept provide a call branding service utilizing a mobile app associated with an enterprise on the user's mobile device. Call branding in accordance with embodiments discussed herein provides a seamless way to provide call branding to the customer without a huge increase in cost.

Referring now to the flowchart of FIG. 5, operations for providing brand identification with incoming communications at a mobile device will be discussed. As illustrated in FIG. 5, operations begin at block 500 by receiving a request for a communication session with a mobile device from an originating enterprise. The communication session may be, for example, a voice session or a video session. The mobile device has a mobile app associated with the originating enterprise installed on the mobile device. Information associated with the originating enterprise may be obtained including, for example, a telephone number, a logo and an enterprise name associated with the originating enterprise (block 510). The information associated with the originating enterprise is pushed to the mobile device utilizing the mobile app associated with the originating enterprise installed on the mobile device such that the information associated with the originating enterprise is delivered to the mobile device simultaneously with delivery of the communication session (block 520). An example of a mobile device including the branding information in combination with an incoming call is illustrated in, for example, FIG. 4.

In some embodiments, obtaining the information may be proceeded by invoking a call branding service associated with the originating enterprise responsive to the request for the communication session. This call branding service can be invoked from a service provider or from the enterprise itself without departing from the scope of the present inventive concept. Once the service is invoked, the request for the communication session may be verified to make sure it is a valid request from a legitimate source.

Once the information is pushed to the mobile device using the mobile app, the telephone number, a name associated with the originating enterprise and a logo associated with the originating enterprise may be displayed on a display associated with the mobile device simultaneously with the delivery of the communication session. Simultaneous arrival of the pushed information associated the originating enterprise and the communication session provides a level of security against fraudulent communications.

It will be understood that the request for the communication session may be a request for a voice session from an enterprise subscribing to a call branding service or a request for a communication session from a third party entity.

Figure 6:
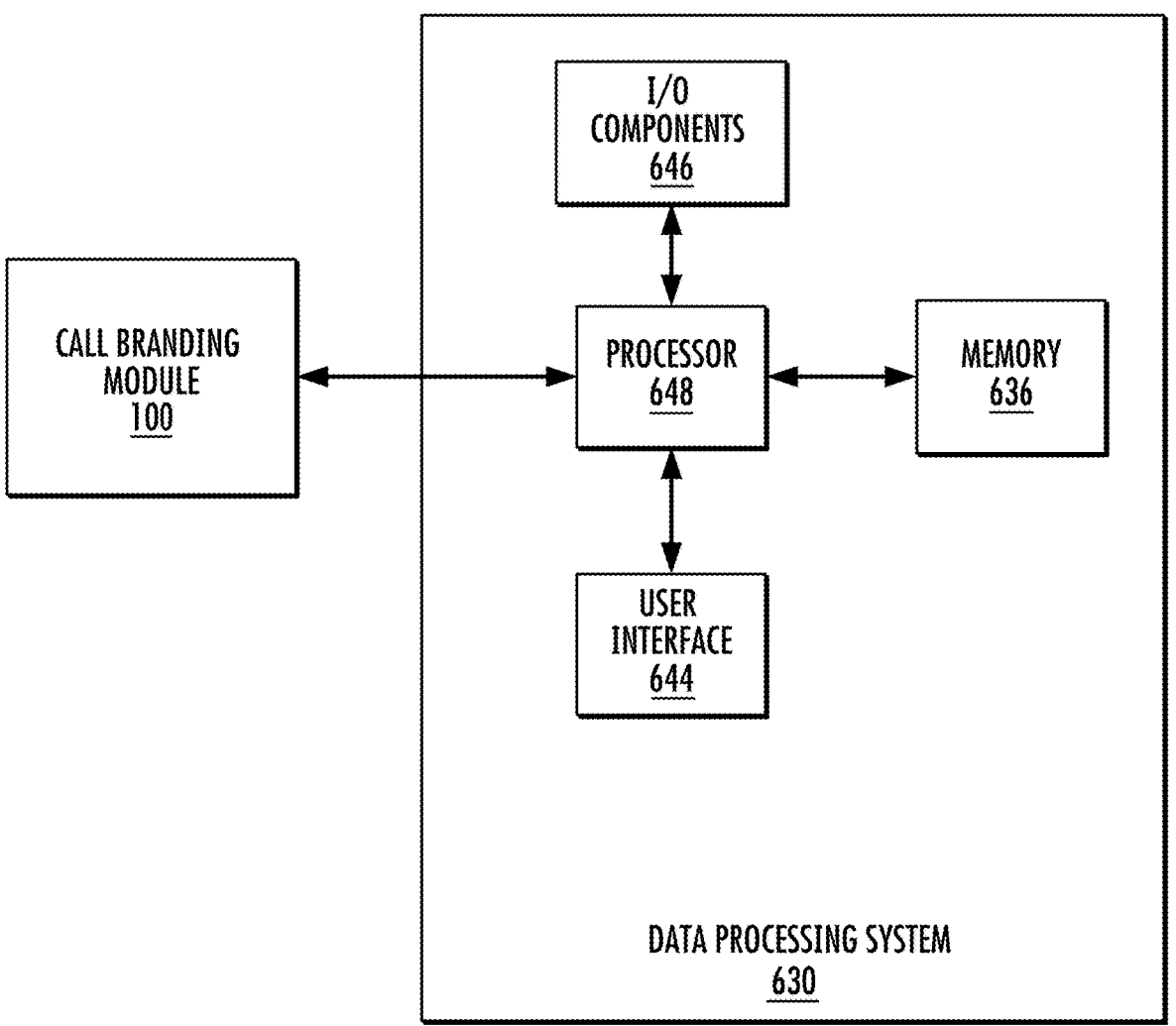
FIG. 6 is a block diagram of a data processing system for use in accordance with some embodiments of the present inventive concept.

Referring now to FIG. 6, an example of a data processing system 630 suitable for use with any of the examples described above. Although the example data processing system 630 is shown as in communication with a call branding module 100 in accordance with embodiments of the present inventive concept, the data processing system 30 may also be part of any other component of the system 101 without departing from the scope of the present inventive concept. In some examples, the data processing system 630 can be any suitable computing device for performing operations according to the embodiments discussed herein.

As illustrated, the data processing system 630 includes a processor 648 communicatively coupled to I/O components 646, a user interface 644 and a memory 636. The processor 648 can include one or more commercially available processors, embedded processors, secure processors, microprocessors, dual microprocessors, multi-core processors, other multi-processor architectures, another suitable processing device, or any combination of these. The memory 636, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 630.

I/O components 646 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storages such as magnetic, optical, or other storage media included in the data processing system and/or coupled to processor 648.

The user interface 644 may include, for example, a keyboard, keypad, touchpad, voice activation circuit, display or the like and the processor 648 may execute program code or instructions stored in memory 636.

It should be appreciated that data processing system 630 may also include additional processors, additional storage, and a computer-readable medium (not shown). The processor(s) 648 may execute additional computer-executable program instructions stored in memory 636. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above with respect to FIGS. 1 through 6, some embodiments of the present inventive concept provide methods and system for providing call branding information simultaneously with an incoming call at a mobile device utilizing a mobile app installed on the mobile device associated with an enterprise originating the call. Thus, embodiments of the present inventive concept provide a cost effective way to provide call branding information and increase the likelihood that the call is not fraudulent.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flow-charts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:
1. A method for providing brand identification with incoming communications at a mobile device, the method comprising:

receiving a request for a communication session with a mobile device from an originating enterprise, the mobile device having a mobile app associated with the originating enterprise installed on the mobile device, wherein the mobile app associated with the originating enterprise is a branded mobile application of the originating enterprise configured to receive push notifications directly from the originating enterprise;

obtaining information associated with the originating enterprise including a telephone number and brand information associated with the originating enterprise; and pushing the information associated with the originating enterprise to the mobile device utilizing the mobile app associated with the originating enterprise installed on the mobile device such that the information associated with the originating enterprise is delivered to the mobile device concurrently with establishment of the communication session without delaying delivery of the communication session pending receipt of an acknowledgment from the mobile device.

2. The method of claim 1, wherein obtaining the information is preceded by:

invoking a call branding service associated with the originating enterprise responsive to the request for the communication session; and verifying that the request for the communication session is a valid request from a legitimate source.

3. The method of claim 2, wherein invoking comprises invoking the call branding service from the originating enterprise.

4. The method of claim 2, wherein invoking comprises invoking the call branding service from a service provider.

5. The method of claim 1, wherein the pushing the information is followed by displaying the telephone number, a name associated with the originating enterprise and a logo associated with the originating enterprise on a display associated with the mobile device using the mobile app installed on the mobile device simultaneously with the delivery of the communication session.

6. The method of claim 5, wherein simultaneous arrival of the pushed information associated with the originating enterprise and the communication session provides a level of security against fraudulent communications.

7. The method of claim 1, wherein receiving the request for the communication session further comprises receiving a request for a voice session from an enterprise subscribing to a call branding service.

8. The method of claim 1, wherein receiving the request for a communication session further comprises receiving a request for a communication session from a third party entity.

9. A system for providing brand identification with incoming communications at a mobile device, the system including an application programming interface (API) between an originating enterprise associated with a brand and a mobile device and communicating with a call branding module, the API:

receiving a request for a communication session with the mobile device from the originating enterprise, the mobile device having a mobile app associated with the originating enterprise installed on the mobile device, wherein the mobile app associated with the originating enterprise is a branded mobile application of the originating enterprise configured to receive push notifications directly from the originating enterprise;

obtaining information associated with the originating enterprise including a telephone number and brand information associated with the originating enterprise; and pushing the information associated with the originating enterprise to the mobile device utilizing the mobile app associated with the originating enterprise installed on the mobile device such that the information associated with the originating enterprise is delivered to the mobile device concurrently with establishment of the communication session without delaying delivery of the communication session pending receipt of an acknowledgment from the mobile device.

10. The system of claim 9, wherein prior to the API obtaining the information, the API:

invokes a call branding service associated with the originating enterprise responsive to the request for the communication session; and verifies that the request for the communication session is a valid request from a legitimate source.

11. The system of claim 10, wherein system invokes the call branding service from the originating enterprise.

12. The system of claim 10, wherein invoking comprises invoking the call branding service from a service provider.

13. The system of claim 9, further comprising a display associated with the mobile device, the system displaying, after the information is pushed, the telephone number, a name associated with the originating enterprise and a logo associated with the originating enterprise on the display using the mobile app installed on the mobile device simultaneously with the delivery of the communication session.

14. The system of claim 13, wherein simultaneous arrival of the pushed information associated with the originating enterprise and the communication session provides a level of security against fraudulent communications.

15. The system of claim 9, wherein the communication request is a request for a voice session from an enterprise subscribing to a call branding service.

16. The system of claim 9, wherein the communication request is a request for a communication session from a third party entity.

17. At least one machine-readable non-transitory medium running in a communication system for providing brand identification with incoming communications at a mobile device, the at least one machine readable non-transitory medium comprising a set of instructions executable on a computing device to cause the computing device to:

receive a request for a communication session with the mobile device from an originating enterprise, the mobile device having a mobile app associated with the originating enterprise installed on the mobile device, wherein the mobile app associated with the originating enterprise is a branded mobile application of the originating enterprise configured to receive push notifications directly from the originating enterprise;

obtain information associated with the originating enterprise including a telephone number and brand information associated with the originating enterprise; and push the information associated with the originating enterprise to the mobile device utilizing the mobile app associated with the originating enterprise installed on the mobile device such that the information associated with the originating enterprise is delivered to the mobile device concurrently with establishment of the communication session without delaying delivery of the communication session pending receipt of an acknowledgment from the mobile device.

18. The at least one machine-readable non-transitory medium of claim 17, the set of instructions executable causing the computing device to:

invoke a call branding service associated with the originating enterprise responsive to the request for the communication session; and verify that the request for the communication session is a valid request from a legitimate source.

19. The at least one machine-readable non-transitory medium of claim 18, the set of instructions executable causing the computing device to invoke the call branding service from the originating enterprise.

20. The at least one machine-readable non-transitory medium of claim 18, the set of instructions executable causing the computing device to invoke the call branding service from a service provider.

21. The at least one machine-readable non-transitory medium of claim 17, the set of instructions executable causing the computing device to display the telephone number, a name associated with the originating enterprise and a logo associated with the originating enterprise on a display associated with the mobile device using the mobile app installed on the mobile device simultaneously with the delivery of the communication session.

22. The at least one machine-readable non-transitory medium of claim 21, wherein simultaneous arrival of the pushed information associated with the originating enterprise and the communication session provides a level of security against fraudulent communications.

23. The at least one machine-readable non-transitory medium of claim 17, the set of instructions executable causing the computing device to receive a request for a voice session from an enterprise subscribing to a call branding service.

24. The at least one machine-readable non-transitory medium of claim 17, the set of instructions executable causing the computing device to receive a request for a communication session from a third party entity.

\* \* \* \* \*